United States Patent
Chang

(10) Patent No.: US 6,637,992 B1
(45) Date of Patent: Oct. 28, 2003

(54) RETRACTABLE SNAP RING STRUCTURE

(76) Inventor: Vincent Chang, 58, Ma Yuan West St., Taichung (TW)

(*) Notice: Subject to any disclaimer, the term of this patent is extended or adjusted under 35 U.S.C. 154(b) by 0 days.

(21) Appl. No.: 10/186,589

(22) Filed: Jun. 28, 2002

(51) Int. Cl.⁷ .............................................. B61D 45/00
(52) U.S. Cl. ....................................... 410/107; 410/111
(58) Field of Search ................................ 410/107, 101, 410/106, 110, 111, 116; 24/265 CD, 115 K; 248/499

(56) References Cited

U.S. PATENT DOCUMENTS

| | | | |
|---|---|---|---|
| 2,729,417 A | * | 1/1956 | Maynard |
| 4,672,909 A | * | 6/1987 | Sweetsir ..................... 410/107 |
| 4,741,653 A | * | 5/1988 | Schmidt ..................... 410/111 |
| 4,820,093 A | * | 4/1989 | Hirakui et al. .............. 410/107 |
| 4,890,566 A | * | 1/1990 | Morris ....................... 410/107 |
| 4,945,849 A | * | 8/1990 | Morris et al. ............... 410/107 |
| 5,004,388 A | * | 4/1991 | Harris ....................... 410/107 |
| 5,106,248 A | * | 4/1992 | Harris ....................... 410/107 |
| 5,444,897 A | * | 8/1995 | Gross ..................... 24/265 CD |
| 5,971,684 A | * | 10/1999 | Wang ....................... 410/107 |
| 6,231,285 B1 | * | 5/2001 | Elwell et al. ............... 410/107 |
| 6,464,437 B1 | * | 10/2002 | Elwell ....................... 410/107 |
| 6,533,512 B2 | * | 3/2003 | Lin ........................... 410/107 |
| 6,565,301 B1 | * | 5/2003 | Lin ........................... 410/107 |
| 2003/0039526 A1 | * | 2/2003 | Yuan ........................ 410/107 |

* cited by examiner

Primary Examiner—Joseph D. Pape
Assistant Examiner—Hilary Gutman

(57) ABSTRACT

A retractable snap ring structure includes a snapping hook, a clamping seat, a receiving box, a bottom housing, a fixing plate, an upper washer, a lower washer, a vehicle body, a spring, and a small-sized spring. The hook portion of the snapping hook may be protruded outward from or retracted into the vehicle body by a simple pressing action, thereby facilitating the user using the retractable snap ring structure. Thus, when the snapping hook is not in use, the hook portion of the snapping hook may be retracted and hidden in the vehicle body, thereby preventing the hook portion of the snapping hook from protruding outward to hurt the people, and thereby increasing the lifetime of the snap ring structure.

11 Claims, 4 Drawing Sheets

RETRACTABLE SNAP RING STRUCTURE

BACKGROUND OF THE INVENTION

1. Field of the Invention

The present invention relates to a retractable snap ring structure, and more particularly to a retractable snap ring structure, wherein when the snapping hook is not in use, the hook portion of the snapping hook may be retracted and hidden in the vehicle body, thereby preventing the hook portion of the snapping hook from protruding outward to hurt the people, and thereby increasing the lifetime of the snap ring structure.

2. Description of the Related Art

A conventional snap ring in accordance with the prior art may be mounted on the body of a vehicle, such as the truck or the like, for passage of a rope, so that the articles received in the vehicle body may be fixed by the rope, thereby preventing the articles from detaching from the vehicle body during the transportation process. However, the conventional snap ring is protruded outward from the vehicle body, thereby easily hooking or hurting the people due to an unintentional hit. In addition, the conventional snap ring is easily hit or collided by the articles during the transportation process, thereby easily damaging the articles, and thereby greatly decreasing the lifetime of the conventional snap ring.

SUMMARY OF THE INVENTION

The present invention has arisen to mitigate and/or obviate the disadvantage of the conventional snap ring.

The primary objective of the present invention is to provide a retractable snap ring structure, wherein when the snapping hook is not in use, the hook portion of the snapping hook may be retracted and hidden in the vehicle body, thereby preventing the hook portion of the snapping hook from protruding outward to hurt the people, and thereby increasing the lifetime of the snap ring structure.

Another objective of the present invention is to provide a retractable snap ring structure, wherein the hook portion of the snapping hook may be protruded outward from or retracted into the vehicle body by a simple pressing action, thereby facilitating the user using the retractable snap ring structure.

A further objective of the present invention is to provide a retractable snap ring structure that may be operated easily and conveniently.

In accordance with the present invention, there is provided a retractable snap ring structure, comprising a snapping hook, a clamping seat, a receiving box, a bottom housing, a fixing plate, an upper washer, a lower washer, a vehicle body, a spring, and a small-sized spring, wherein:

the snapping hook is integrally formed with a hollow hook portion, the hook portion of the snapping hook has a bottom provided with a stop portion, the stop portion of the snapping hook has a bottom face integrally formed with a locking portion which extends downward;

the clamping seat has a top portion provided with two opposite serrated locking blocks;

the receiving box is formed with two rectangular locking slots;

the bottom housing has an opened top portion provided with two opposite wing-shaped lugs each formed with a screw bore;

the fixing plate is formed with an oblong slot, and two opposite circular through holes each located beside the oblong slot;

the upper washer is formed with an oblong slot, and two circular opposite through holes each located beside the oblong slot;

the lower washer is formed with an oblong slot, and two circular opposite through holes each located beside the oblong slot;

the vehicle body is formed with an oblong slot, and two circular opposite through holes each located beside the oblong slot;

the spring has a first end secured on the locking portion of the snapping hook, and a second end secured on the locking blocks of the clamping seat;

the clamping seat and the small-sized spring are pivotally mounted in the two rectangular locking slots of the receiving box;

the stop portion of the snapping hook is mounted on the opened top portion of the bottom housing; and the hook portion of the snapping hook is in turn extended through the oblong slot of the lower washer, the oblong slot of the vehicle body, the oblong slot of the upper washer and the oblong slot of the fixing plate, and is protruded outward from the oblong slot of the fixing plate.

Further benefits and advantages of the present invention will become apparent after a careful reading of the detailed description with appropriate reference to the accompanying drawings.

DETAILED DESCRIPTION OF THE INVENTION

Figure 1:
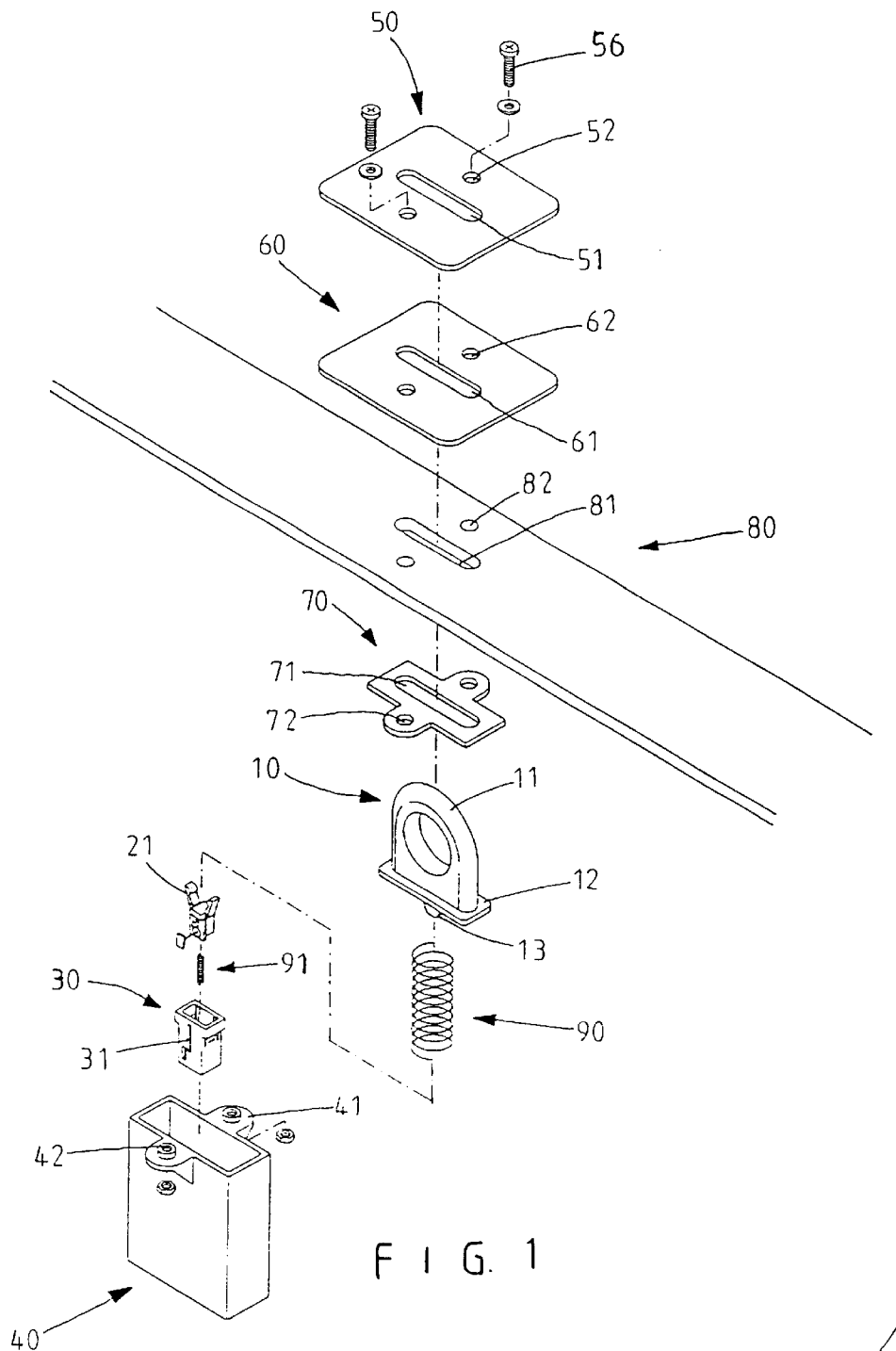
FIG. 1 is an exploded perspective view of a retractable snap ring structure in accordance with a first embodiment of the present invention.
Figure 1A:
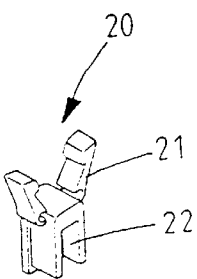
FIG. 1A is an enlarged perspective view of a clamping seat of the retractable snap ring structure as shown in FIG. 1.
Figure 2:
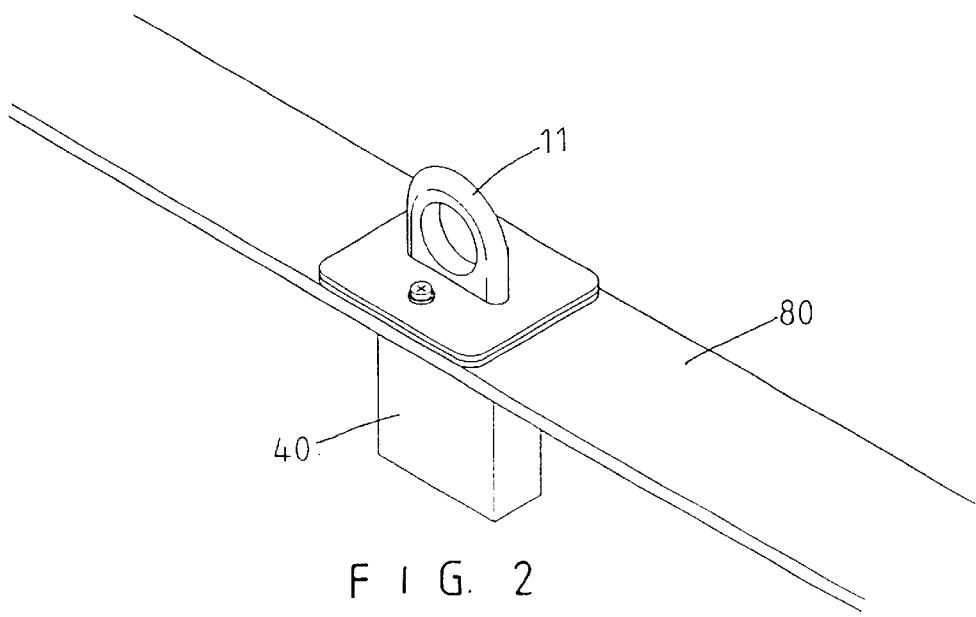
FIG. 2 is a perspective assembly view of the retractable snap ring structure in accordance with the first embodiment of the present invention.
Figure 3:
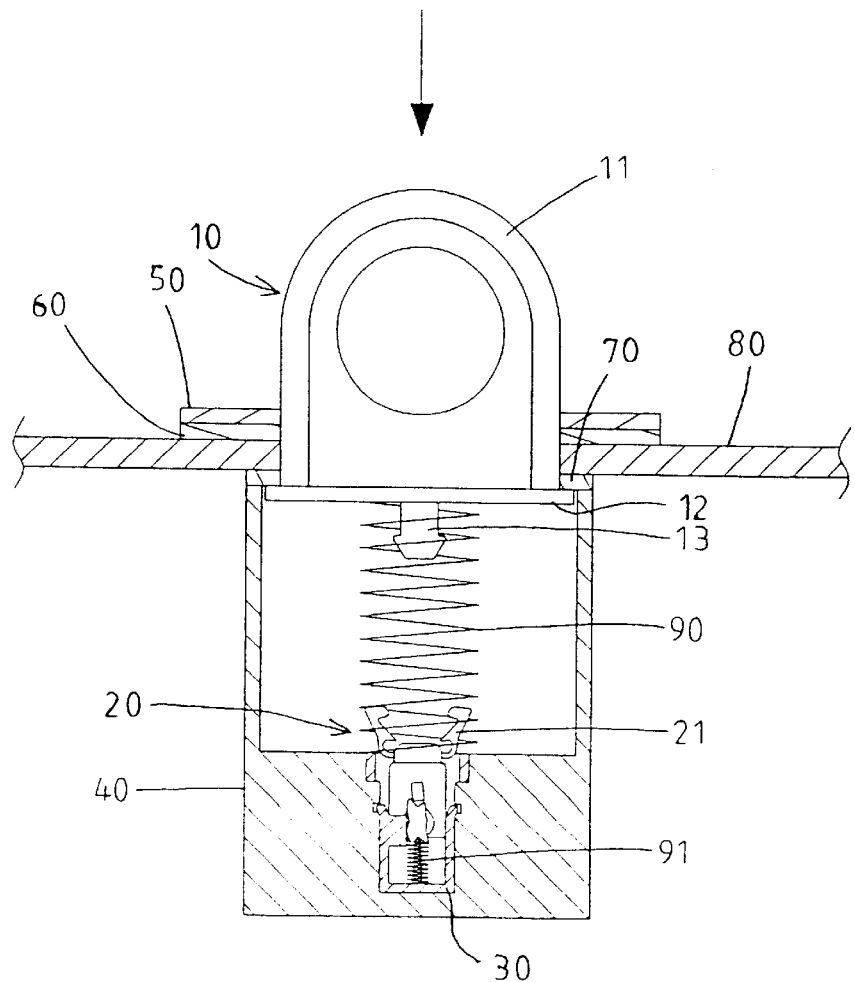
FIG. 3 is a front plan cross-sectional assembly view of the retractable snap ring structure as shown in FIG. 1.

Referring to the drawings and initially to FIGS. 1–3, a retractable snap ring structure in accordance with a first embodiment of the present invention comprises a snapping hook 10, a clamping seat 20, a receiving box 30, a bottom housing 40, a fixing plate 50, an upper washer 60, a lower washer 70, a vehicle body 80, a spring 90, a small-sized spring 91, and two screws 56.

The snapping hook 10 is made by a punching process to be integrally formed with a hollow hook portion 11. The hook portion 11 of the snapping hook 10 has a bottom provided with a stop portion 12. The stop portion 12 of the snapping hook 10 has a bottom face integrally formed with a locking portion 13 which extends downward. The locking portion 13 of the snapping hook 10 is a substantially mushroom-shaped body.

The clamping seat 20 is a substantially pliers-shaped body, and has a top portion provided with two opposite serrated locking blocks 21, and a bottom portion formed with a channel 22.

The receiving box 30 is a substantially T-shaped hollow box, and is formed with two rectangular locking slots 31.

The bottom housing 40 is a substantially wing-shaped box, and has an opened top portion provided with two opposite wing-shaped lugs 41 each formed with a screw bore 42.

The fixing plate 50 is a substantially rectangular plate, and is formed with an oblong slot 51, and two opposite circular through holes 52 each located beside the oblong slot 5 1.

The upper washer 60 has a size equal to that of the fixing plate 50, and is formed with an oblong slot 61, and two circular opposite through holes 62 each located beside the oblong slot 61.

The lower washer 70 is a substantially X-shaped plate, and is formed with an oblong slot 71, and two circular opposite through holes 72 each located beside the oblong slot 71.

The vehicle body 80 is formed with an oblong slot 81, and two circular opposite through holes 82 each located beside the oblong slot 81.

In assembly, the spring 90 has a first end secured on the locking portion 13 of the snapping hook 10, and a second end secured on the locking blocks 21 of the clamping seat 20. Then, the clamping seat 20 and the small-sized spring 91 are pivotally mounted in the two rectangular locking slots 31 of the receiving box 30 which is received in the bottom housing 40. Then, the stop portion 12 of the snapping hook 10 is mounted on the opened top portion of the bottom housing 40. Then, the hook portion 11 of the snapping hook 10 is in turn extended through the oblong slot 71 of the lower washer 70, the oblong slot 81 of the vehicle body 80, the oblong slot 61 of the upper washer 60 and the oblong slot 51 of the fixing plate 50, and is protruded outward from the oblong slot 51 of the fixing plate 50. Then, each of the two screws 56 is in turn extended through each of the two through holes 52 of the fixing plate 50, each of the two through holes 62 of the upper washer 60, each of the two through holes 82 of the vehicle body 80 and each of the two through holes 72 of the lower washer 70, and is screwed into each of the two screw bores 42 of the bottom housing 40, thereby securing the fixing plate 50, the upper washer 60, the lower washer 70 and the bottom housing 40 on the vehicle body 80. Thus, the retractable snap ring structure in accordance with a first embodiment of the present invention is assembled.

Figure 4:
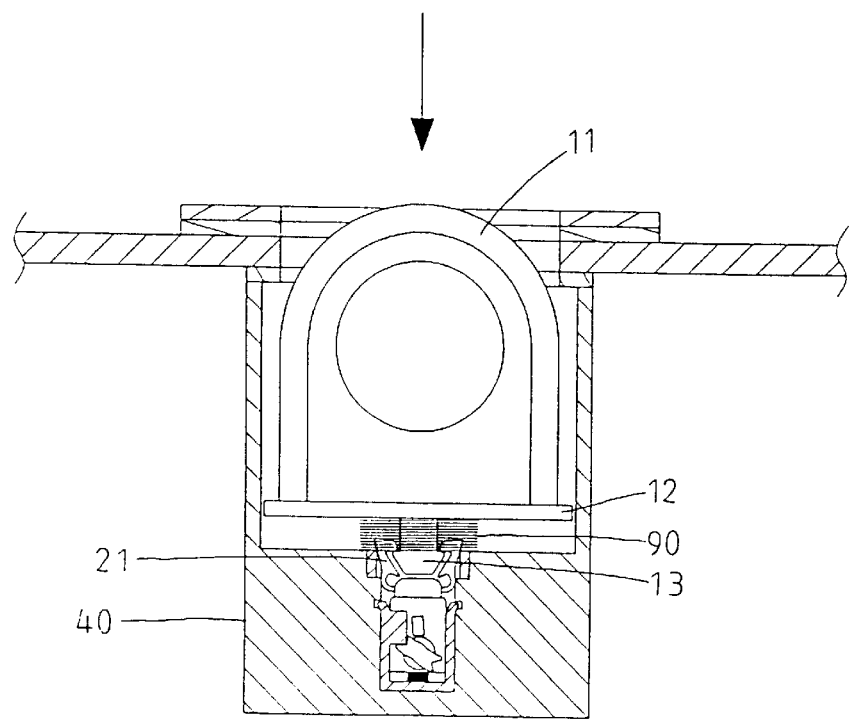
FIG. 4 is a schematic operational view of the retractable snap ring structure as shown in FIG. 3 in use.

Referring to FIGS. 3 and 4, with reference to FIGS. 1 and 2, the top end of the hook portion 11 of the snapping hook 10 may be directly pressed to compress the spring 90, so that the locking portion 13 of the snapping hook 10 may be moved downward to be locked with the locking blocks 21 of the clamping seat 20, thereby retracting the hook portion 11 of the snapping hook 10 into the vehicle body 80 as shown in FIG. 4. Then, the top end of the hook portion 11 of the snapping hook 10 may be pressed again, so that the locking portion 13 of the snapping hook 10 may be detached from the locking blocks 21 of the clamping seat 20 by the restoring force of the spring 90. Thus, the hook portion 11 of the snapping hook 10 may be moved upward to return to the original position as shown in FIG. 3 so as to protrude outward from the oblong slot 51 of the fixing plate 50. In addition, the stop portion 12 of the snapping hook 10 is rested on the lower washer 70, thereby preventing from detachment of the hook portion 111 of the snapping hook 10.

Accordingly, the hook portion 11 of the snapping hook 10 protruding outward from the vehicle body 80 may be pressed easily, so that the hook portion 11 of the snapping hook 10 may be protruded outward from or retracted into the vehicle body 80 by a simple pressing action, thereby facilitating the user using the retractable snap ring structure. Thus, the retractable snap ring structure in accordance with the present invention may be operated easily and conveniently, and has a long lifetime.

Figure 6:
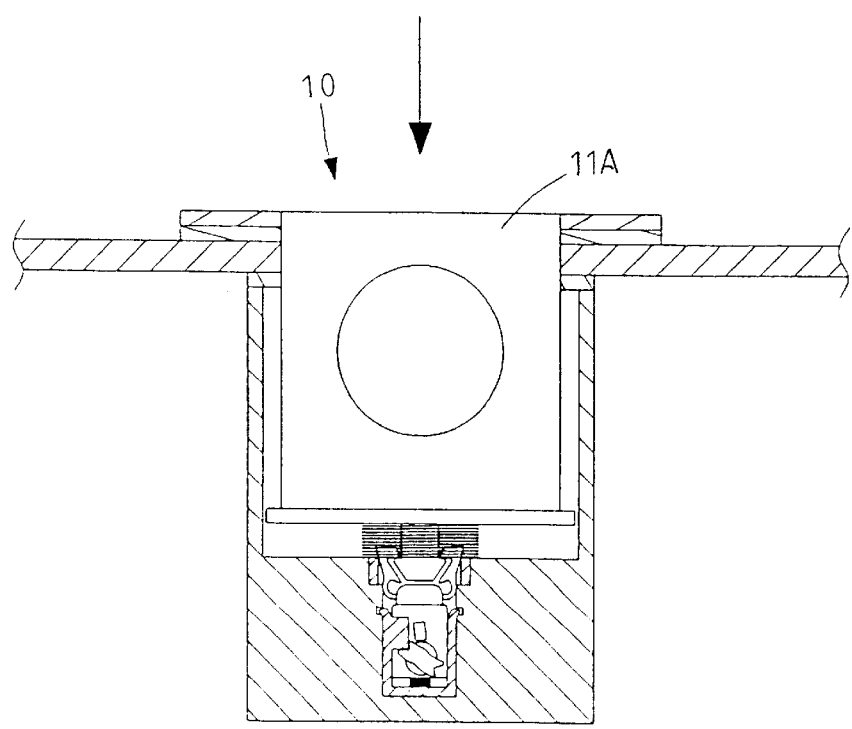
FIG. 6 is a front plan cross-sectional assembly view of the retractable snap ring structure as shown in FIG. 5.
Figure 5:
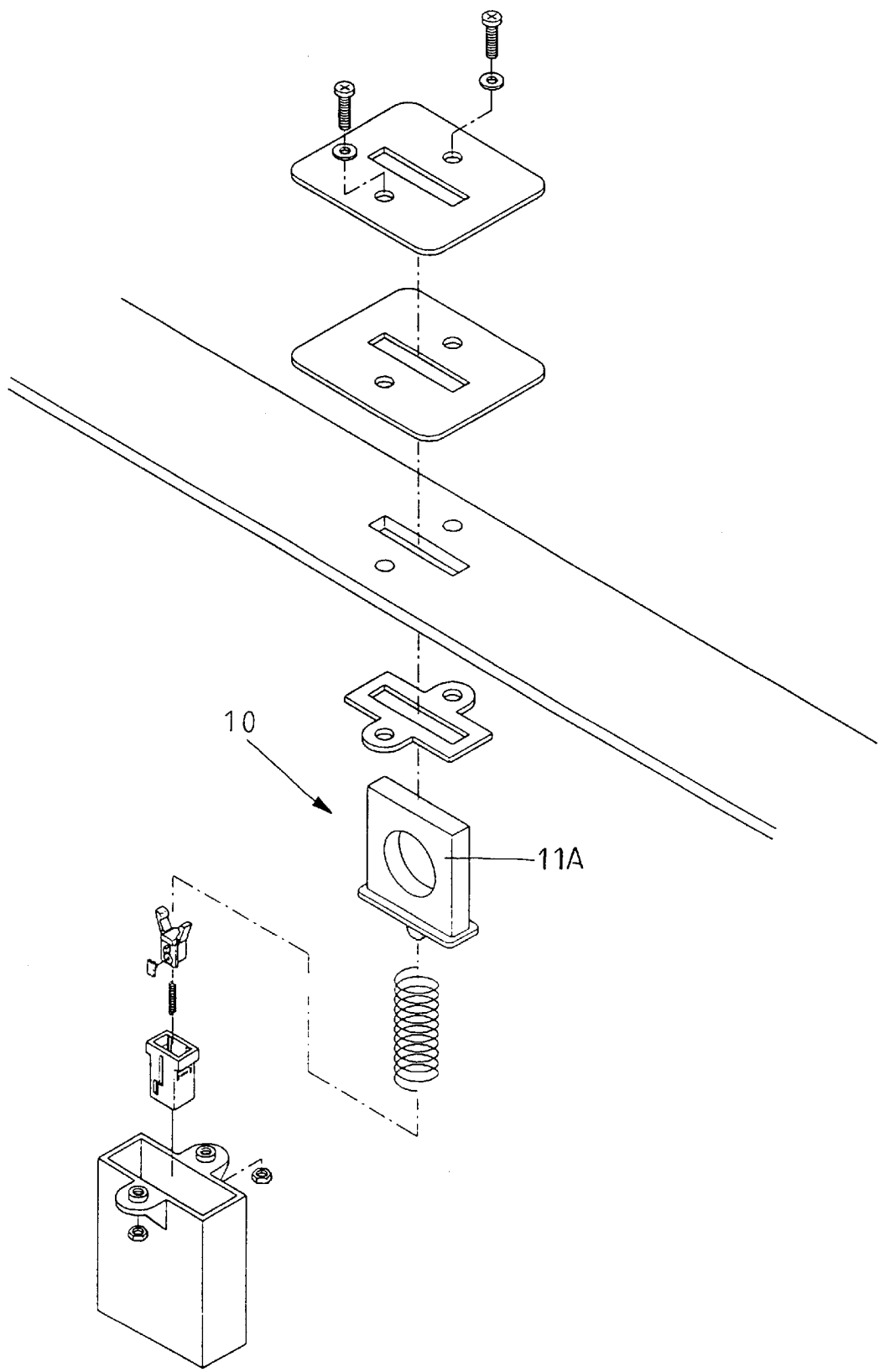
FIG. 5 is an exploded perspective view of a retractable snap ring structure in accordance with a second embodiment of the present invention.

Referring to FIGS. 5 and 6, a retractable snap ring structure in accordance with a second embodiment of the present invention is shown. In the retractable snap ring structure in accordance with the second embodiment of the present invention, the hollow hook portion 11A of the snapping hook 10 is substantially rectangular shaped.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A retractable snap ring structure, comprising a snapping hook, a clamping seat, a receiving box, a bottom housing, a fixing plate, an upper washer, a lower washer, a vehicle body, a spring, and a small-sized spring, wherein:

the snapping hook is integrally formed with a hollow hook portion, the hook portion of the snapping hook has a bottom provided with a stop portion, the stop portion of the snapping hook has a bottom face integrally formed with a locking portion which extends downward;

the clamping seat has a top portion provided with two opposite serrated locking blocks;

the receiving box is formed with two rectangular locking slots;

the bottom housing has an opened top portion provided with two opposite wing-shaped lugs each formed with a screw bore;

the fixing plate is formed with an oblong slot, and two opposite circular through holes each located beside the oblong slot;

the upper washer is formed with an oblong slot, and two circular opposite through holes each located beside the oblong slot;

the lower washer is formed with an oblong slot, and two circular opposite through holes each located beside the oblong slot;

the vehicle body is formed with an oblong slot, and two circular opposite through holes each located beside the oblong slot;

the spring has a first end secured on the locking portion of the snapping hook, and a second end secured on the locking blocks of the clamping seat;

the clamping seat and the small-sized spring are pivotally mounted in the two rectangular locking slots of the receiving box which is received in the bottom housing;

the stop portion of the snapping hook is mounted on the opened top portion of the bottom housing; and the hook portion of the snapping hook is in turn extended through the oblong slot of the lower washer, the oblong slot of the vehicle body, the oblong slot of the upper washer and the oblong slot of the fixing plate, and is protruded outward from the oblong slot of the fixing plate.

2. The retractable snap ring structure in accordance with claim 1, wherein the locking portion of the snapping hook is a substantially mushroom-shaped body.

3. The retractable snap ring structure in accordance with claim 1, wherein the clamping seat is a substantially pliers-shaped body.

4. The retractable snap ring structure in accordance with claim 1, wherein the clamping seat has a bottom portion formed with a channel.

5. The retractable snap ring structure in accordance with claim 1, wherein the receiving box is a substantially T-shaped hollow box.

6. The retractable snap ring structure in accordance with claim 1, wherein the bottom housing is a substantially wing-shaped box.

7. The retractable snap ring structure in accordance with claim 1, wherein the fixing plate is a substantially rectangular plate.

8. The retractable snap ring structure in accordance with claim 1, wherein the upper washer has a size equal to that of the fixing plate.

9. The retractable snap ring structure in accordance with claim 1, wherein the lower washer is a substantially X-shaped plate.

10. The retractable snap ring structure in accordance with claim 1, further comprising two screws each in turn extended through each of the two through holes of the fixing plate, each of the two through holes of the upper washer, each of the two through holes of the vehicle body and each of the two through holes of the lower washer, and is screwed into each of the two screw bores of the bottom housing, thereby securing the fixing plate, the upper washer, the lower washer and the bottom housing on the vehicle body.

11. The retractable snap ring structure in accordance with claim 1, wherein the hollow hook portion of the snapping hook is substantially rectangular shaped.

* * * * *